United States Patent Office 2,907,650
Patented Oct. 6, 1959

2,907,650

PLANT GROWTH STIMULATION

Louis G. Nickell, Port Washington, N.Y., assignor to Chas. Pfizer & Co., Inc., New York, N.Y., a corporation of Delaware No Drawing. Application October 17, 1956
Serial No. 616,362

5 Claims. (Cl. 71—2.5)

This invention is concerned with a method of stimulating plant growth and with compositions of value for this purpose.

A variety of materials have been used in the past to stimulate the growth of plants. Commercial fertilizers are widely used for this purpose and various hormone products and other organic compounds have, also, been recognized as of value. Recent work has indicated that antibiotics have a stimulatory effect, particularly during the early stages of plant growth. It has now been found that a degradation product of a broad spectrum antibiotic which itself has little or no antibiotic activity, nevertheless, has a surprisingly great effect on plant growth. This material has not been shown to have any value apart from that of assisting in studies of the structure and chemistry of the parent antibiotic. The compound referred to is isochlortetracycline and it is prepared from the antibiotic chlortetracycline (available under the trademark "Aureomycin") by the action of alkaline agents. A detailed description of the preparation of this material and its properties is given in a scientific article of Waller, et al. in the Journal of the American Chemical Society, volume 74, page 4981 (1952). The product has been referred to as "isoaureomycin" but it is more properly designated by the generic term isochlortetracycline. As noted above this material has never been shown to have any particualr value, apart from purely scientific interest, before the present invention. It has none of the microbiological activity associated with an antibiotic.

Not only is isochlortetracycline effective in stimulating the growth of plants in the ordinary sense, but it is also useful for stimulating the rate of sprouting of various seeds which are subjected to sprouting in commercially important processes. Thus it has a marked effect on the sprouting of barley seeds in the manufacture of barley malt wherein the substance is particularly effective in stimulating rapid formation of sprouts and the production of a high proportion of the valuable enzyme, diastase.

Among the plants with which the stimulatory effect of the compound isochlortetracycline may be demonstrated is the small plant known as duckweed (*Lemna minor*) which grows readily on the surface of still bodies of water. A variety of other plants, particularly in the seed or seedling stage, may be stimulated in their growth by the application of a very low concentration of isochlortetracycline. Other types of plants with which isochlortetracycline has startling value as a stimulant are the Fungi Imperfecti, Ascomycetes, Phycomycetes, and in general the spore-forming molds. In general the plant roots, seeds, spores or mycelium are contacted with as little as 0.5 parts per million concentration of the material in the surrounding medium to obtain a very great stimulation of growth. Concentrations of as high as 50 parts per million are also very stimulatory although the use of larger amount of material may not be economical. When the compound is used for the stimulation of the growth of seeds or seedlings in soil, it must be realized that some of the compound may be adsorbed by materials present in the soil, such as clay, so that under these circumstances a higher proportion may be required. A solution of the material may be sprayed on the ground before or after seeding or during the course of growth. Alternatively, solid diluents may be mixed with the product before its application to soil.

Isochlortetracycline may be diluted with a variety of materials to make simpler the application of a suitable low concentration of this valuable material. The diluent may be a solvent such as water or an organic solvent nontoxic to the treated plant material. Other diluents such as diatomaceous earths, gypsum, limestone, fuller's earth, vegetable flours, sand or other inert solids or active solids such as commercial fertilizers may be used. All of these are agriculturally acceptable carriers which are not deleterious to economically valuable plant life.

The following examples are given by way of illustration and are not to be construed as the only embodiment of this invention. It is to be understood that protection hereof is only to be limited by the specific wording of the appended claims.

*Example I*

Samples of sterile nutrient medium were seeded with rosettes of leaves of the plant duckweed. Each of the samples of nutrient medium contained a different concentration of isochlortetracycline. The medium had the following composition:

| | |
|---|---|
| $KNO_3$ | 0.002 M |
| $Ca(NO_3)_2$ | 0.003 M |
| $KH_2PO_4$ | 0.001 M |
| $MgSo_4$ | 0.001 M |
| $CaCl_2$ | 0.003 M |
| KCl | 0.002 M |
| MgCl | 0.001 M |
| Sucrose | 2% |
| Thiamine | 100γ/l. |
| Pyridoxin | 800γ/l. |
| Nicotinamide | 800γ/l. |
| B | 0.1 p.p.m. |
| Mn | 0.1 p.p.m. |
| Zn | 0.3 p.p.m. |
| Cu | 0.1 p.p.m. |
| Mo | 0.1 p.p.m. |
| Fe | 0.5 p.p.m. |

In some cases it was necessary to heat the medium gently to obtain dissolution of the compound. One sample of the medium was not treated with any isochlortetracycline. In the following table is summarized the result of the experiment. In the first column is given the concentration of parts per million of isochlortetracycline in the medium. In the second column is given the increased growth as represented by the wet weight of the total duckweed present in the medium at the end of three weeks and as compared to the control solution containing only nutrient medium and duckweed but no isochlortetracycline.

| Concentration isochlortetracycline: | Percent increase in growth |
|---|---|
| 1 p.p.m. | +75 |
| 5 p.p.m. | +120 |
| 10 p.p.m. | +950 |
| 20 p.p.m. | +1050 |

It can be seen from the above table that there is an extremely great increase in the growth of duckweed in the presence of isochlortetracycline. Thus at 20 parts per million the growth rate at the end of three weeks is more than ten times that of the control.

*Example II*

Barley seeds of uniform quality were soaked in water and in varying concentrations of isochlortetracycline solutions for 24 hours. Equal numbers of seeds were used in each group. The seeds were then allowed to stand in a moist, warm atmosphere for several days. At the end of the test period, the sprouted seeds in each group were weighed and a determination of the amount of diastase was made after drying by means of a standrad test (Litner). In the following table is summarized the weight of the sprouted grain in each group and the proportion of diastase as measured by the Litner test.

| Isochlortetracycline Concentration, p.p.m. | Wet Weight of Grains Before Milling and Drying, grams | Litner Assay |
| --- | --- | --- |
| 0 | 9.1 | 23.0 |
| 10 | 10.9 | 41.4 |
| 20 | 11.8 | 55.2 |
| 40 | 11.3 | 46.0 |

It will be noted that the use of isochlortetracycline solution to steep the barley had a very definite effect on the weight of the sprouted grain and on the proportion of diastase produced during the sprouting reaction. Since the value of the barley malt is approximately in proportion to the diastase present, the isochlortetracycline treatment is of definite value in this process.

Example III

Groups of 100 barley seeds each of which were of uniform quality were placed between layers of filter paper that had been soaked in water or in dilute solution of isochlortetracycline. The seeds were stored at 28° C. for a period of five days. The filter papers were maintained in a moist state for five days by addition of water. At the end of five days the samples were weighed to determine total weight of each sample. In the following table is summarized the results.

Concentration of isochlortetracycline:  Total wet weight of seeds, grams
   0 p.p.m. ---------------------------------- 9.1
   10 p.p.m. --------------------------------- 10.6
   20 p.p.m. --------------------------------- 11.0
   30 p.p.m. --------------------------------- 10.0

The seeds in the isochlortetracycline treated groups displayed larger sprouts.

Example IV

A nutrient medium as in Example I was inoculated with a suspension of spores of the fungus *Rhizopus delemar*. The mixture was placed in a cotton stoppered flask and allowed to stand at room temperature for one week. The mycelium was removed from the solution and was dried in an oven at 110° C. A group of ten such experiments were conducted and the total weight of the mycelium from the ten flasks was recorded. In further groups of ten flasks was placed the same medium containing varying concentrations from 1 to 20 p.p.m. of isochlortetracycline. The total weight of mycelium from each of these groups was also determined. In the following table is recorded the results of these experiments.

Isochlortetracycline concentration:  Weight of dry mycelium, mgm.
   0 p.p.m. ---------------------------------- 123.0
   1 p.p.m. ---------------------------------- 182.5
   5 p.p.m. ---------------------------------- 219.0
   10 p.p.m. --------------------------------- 238.5
   20 p.p.m. --------------------------------- 250.0

It is obvious from the above table that isochlortetracycline was definitely effective in increasing the rate of growth of this fungus in a nutrient medium.

Example V

An experiment identical with the one described above was conducted but the organism used was the fungus *Curvularia lunata* on nutrient medium as in Example I. This organism may be used for the manufacture of hydrocortisone. The following table gives the results of this experiment.

Isochlortetracycline concentration:  Weight of dry mycelium, mgm.
   0 p.p.m. ---------------------------------- 1035.0
   20 p.p.m. --------------------------------- 1121.4

Thus a definite stimulation in the growth of this organism was observed when isochlortetracycline was added to a nutrient medium in which the organism was growing under aerobic conditions.

Example VI

*Fusarium oxysporum* and *Gibberella fuji-kuroi* were grown in flasks containing respectively the basal synthetic medium of Example I, this medium plus 20 p.p.m. of isochlortetracycline (ICT), and the medium plus 40 p.p.m. of ICT. After inoculation, the flasks were incubated for 8 days at 23° C. in the dark. At this time the mycelial mat was filtered off, dried in an oven overnight, and weighed. The dry weights are given below.

[Average dry weight in mgm. (5 flasks)]

|  | Control | 20 p.p.m. ICT | 40 p.p.m. ICT |
| --- | --- | --- | --- |
| F. oxysporum | 92.5 | 115.1 | 122.2 |
| G. fuji-kuroi | 31.6 | 78.9 | 74.5 |

Example VII

Cucumber seeds were treated by the procedure of Example II and results are given in the table below. Fresh weight is given in grams and is based on 50 seeds.

ICT
Control ------------------------------------ 6.7
1 p.p.m. ----------------------------------- 8.2
10 p.p.m. ---------------------------------- 8.0
100 p.p.m. --------------------------------- 8.3

The procedure was then repeated with other commercially important plant seeds, with the following results:

|  | Sweet Corn | Radish | Tomato |
| --- | --- | --- | --- |
| Control | 23.5 | 2.5 | 1.3 |
| 1 p.p.m. | 25.0 | 2.9 | 1.7 |
| 10 p.p.m. | 29.0 | 2.8 | 2.1 |
| 100 p.p.m. | 24.0 | 3.6 | 1.9 |

Example VIII

The procedure of Example IV was repeated using spores of *Erysiphe cichoracearum*, the obligate parasite affecting various flowers with the disease known as powdery mildew. The organism is very sensitive and is primarily of value in phytopathological research. The isochlortetracycline treatment was found markedly to stimulate growth of these spores.

Example IX

A non-synthetic aqueous medium was prepared, consisting (per liter) of Cerelose (dextrose hydrate) 10 grams, soybean meal 10 grams, distillers' solubles 5 grams, sodium chloride 5 grams and calcium carbonate 1 gram. Some of this medium was used per se as a control, to some was added 10 mg./ml. of isochlortetracycline, to some was added 20 mg./ml. of the stimulant, and to some, 40 mg./ml. thereof.

Each such medium was then inoculated with spores of *Streptomyces antiboticus* ATCC 11891, an organism designed for producing the valuable antibiotic, oleandomycin.

The same procedure was also followed using spores of *Curvularia lunata* intended for production of the cortical steroid, compound F, from compound S.

In each instance growth of the spores was appreciably increased while the ultimate yields of the antibiotic and steroid, respectively, were wholly unaffected. The increased rate of growth of the spores made possible much more rapid cycles, thus assisting considerably the respective antibiotic- and steroid-producing commercial operations.

This application is a continuation-in-part of my copending application Serial No. 432,311, filed May 25, 1954, now abandoned.

What is claimed is:

1. A process for the stimulation of plant growth which comprises contacting the plant material with isochlortetracycline in an amount sufficient to effect said stimulation.

2. A process for the stimulation of plant growth which comprises contacting seeds with an aqueous solution of a growth-stimulating amount of isochlortetracycline.

3. A process as claimed in claim 1 wherein isochlortetracycline is added to a nutrient medium containing a growing fungus.

4. In the process of sprouting barley the step which comprises contacting said barley seeds with an aqueous solution of a growth-stimulating amount of isochlortetracline.

5. A plant growth stimulant composition which comprises between about 0.5 and about 100 parts per million by weight of isochlortetracycline and a solid agricultural carrier therefor.

References Cited in the file of this patent

Waller et al. in "Journal of American Chemical Society," vol. 74, pages 981–2 (1952).

"Journal of Agricultural Chemistry," vol. 1, page 487 (1953).